Figure 2:
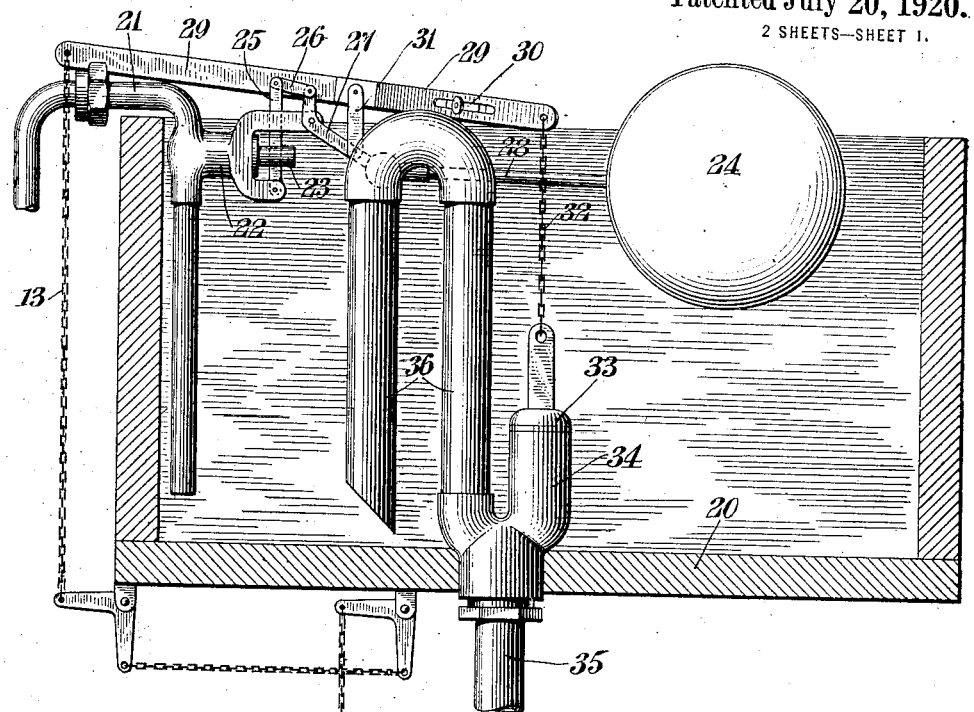
Figure 2:
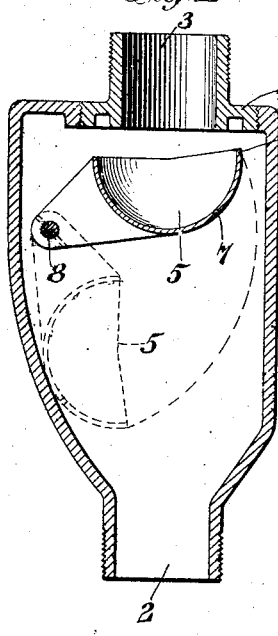

G. P. BENDER.
FLUSHING DEVICE.
APPLICATION FILED JUNE 21, 1916.

1,347,318.

Patented July 20, 1920.
2 SHEETS—SHEET 1.

Inventor
George P. Bender
By his Attorneys

G. P. BENDER.
FLUSHING DEVICE.
APPLICATION FILED JUNE 21, 1916.
1,347,318.
Patented July 20, 1920.
2 SHEETS—SHEET 2.
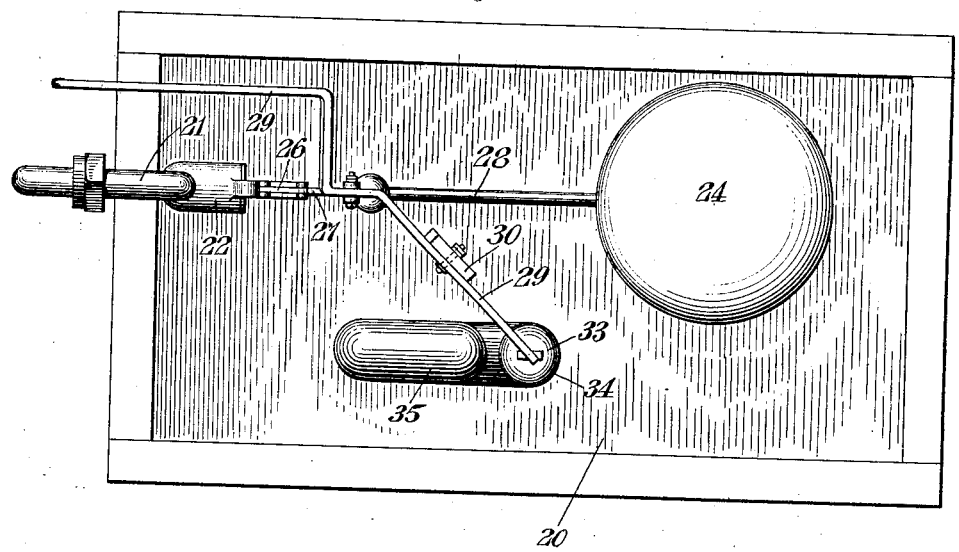
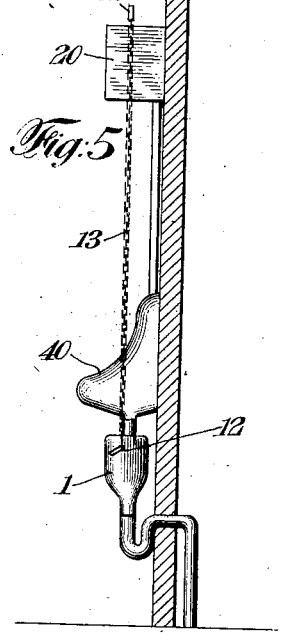
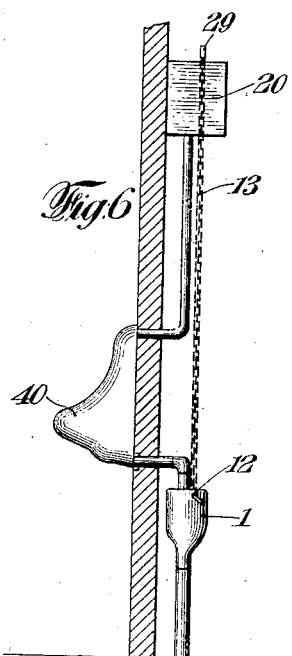
Inventor
George P. Bender
By his Attorneys
Prindle, Wright & Small

UNITED STATES PATENT OFFICE.

GEORGE P. BENDER, OF NEW YORK, N. Y.

FLUSHING DEVICE.

1,347,318.  Specification of Letters Patent.  Patented July 20, 1920.

Application filed June 21, 1916. Serial No. 104,856.

*To all whom it may concern:*

Be it known that I, GEORGE P. BENDER, of New York, in the county of New York, and in the State of New York, have invented a certain new and useful Improvement in Flushing Devices, and do hereby declare that the following is a full, clear, and exact description thereof.

My invention relates to a flushing device and has for its object to provide a flushing device which requires no manipulation but operates automatically and positively under conditions of use.

A further object of my invention is to provide a flushing device which is sanitary and which is economical to construct, to install, and to use.

Other and further objects of my invention will be apparent from the following description and from the accompanying drawings which illustrate one embodiment thereof.

Referring to the drawings:—

Figure 1:
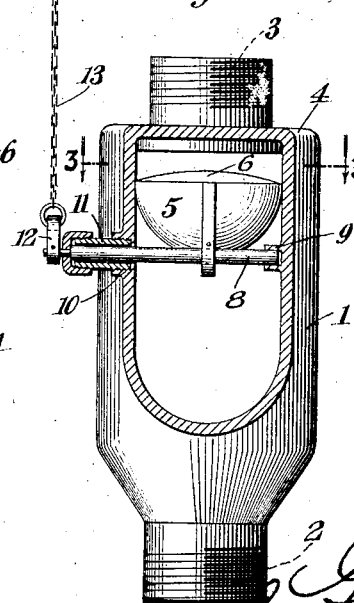
Figure 3:
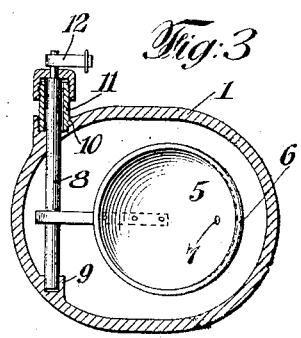

Figure 1 is a rear elevation, partly in section, showing the complete device including an embodiment of a water supply in the form of a tank;

Fig. 2 a vertical section of the lower part of the device taken at right angles to the lower part illustrated in Fig. 1;

Fig. 3 a horizontal section taken on the line 3—3 of Fig. 1, looking in the direction of the arrows;

Fig. 4 a plan of the water supply tank chosen to illustrate the invention;

Fig. 5, a side elevation of one application of my invention showing the device exposed; and Fig. 6, a side elevation of one application of my invention showing the device concealed.

In the embodiment illustrated, reference character 1 indicates a container having an outlet 2 and an inlet 3. The container preferably is provided with a removable top 4, in order to facilitate access to the interior of the container.

Within the container is a receptacle 5 provided with a raised front edge 6, and a weep hole 7, which preferably is nearer the front than the back of the receptacle to permit of draining when the receptacle is in lowered position (dotted lines Fig. 2). The container is adapted to empty itself automatically when a predetermined weight is contained therein, and in the present embodiment is shown as mounted on a shaft 8, one end of which rests in a socket 9, and the other end of which passes through an opening 10 in the container provided with a stuffing box 11. Said shaft 8 is connected to any desired source of water supply, as by an arm 12 on said shaft, connected by a connection 13 with said source of supply.

The source of water supply may be provided in any convenient manner, the embodiment chosen for purposes of illustration comprising a tank and operating means therefor, adapted for use in the combination illustrated.

This source of water supply is shown as comprising a tank 20 having an inlet pipe 21 provided with a valve 22 closed by the action of a plunger 23, preferably operated by a float 24 which may be connected thereto in any desired manner, as by a lever 25 mounted on an extension of the valve, and connected with plunger 23 as by passing through a slot therein. Said lever 25 may be connected by a link 26 with a bell crank lever 27 the other end of which bell crank lever is connected with an arm 28 secured to said float 24.

The outlet from said tank is adapted to be operated by connection 13 which, as has been described before, is operated by the movement of receptacle 5. In the present embodiment, connection 13 is secured to a lever 29 mounted on a fulcrum post 31 which in turn is fixed (either adjustably or not as preferred) on bell crank lever 27. The end of lever 29 opposite to that connected to connection 13 is secured by a connection 32 with a valve 33 closing the entrance to a pipe 34, which is connected with the outlet pipe 35. Valve 33 preferably is of the positive quick-action type, opening and closing completely with a quick motion due to the weight of the water or to suction. In order to determine the weight necessary to be contained in the receptacle to cause the operation of the device, an adjustable counter-weight 30 is provided on lever 29 which may be moved as desired. The lever 29 or its equivalent may be mounted on a float not connected with the inlet valve and said inlet valve operated in any desired manner as by a separate float.

The parts may be arranged, mounted, and adjusted in any desired manner. One convenient and efficient arrangement, for example, will operate as follows:

When receptacle 5 contains a predetermined weight, it will turn a short distance, limited by the upward movement of valve 33, which may be fixed, in the case supposed, at about three quarters of an inch. The water in the tank then escapes through pipe 35 and flushes thoroughly the bowl or other exterior parts leading to the container and then the container itself.

As the water lowers in the tank, float 24 lowers, which opens inlet valve 22 and also lowers lever 29, thereby permitting receptacle 5 to turn more and more until finally, preferably before the tank is emptied, the receptacle has reached the position shown by dotted lines in Fig. 2. After receptacle 5 reaches its final position (dotted line Fig. 2) lever 29 preferably continues to lower, thereby causing the connections between the receptacle and the lever to slacken. When the lever reaches a predetermined position, which preferably is its lowermost position, outlet valve 33 closes, thereby permitting the tank to fill, which raises lever 29 so that its connections with receptacle 5 become taut and the receptacle is raised. During the period of dis-association the receptacle drains so that it is empty while being raised. As the tank fills, float 24 rises, lifting lever 29 therewith, until the parts finally assume normal position. The raised front edge 6 of receptacle 5 insures a sufficient weight of water in the receptacle during the emptying of the tank to maintain valve 33 open. Even if valve 33 should close, the water will escape from pipe 35 through siphon 36. Weep hole 7 prevents unnecessary operation of the device from leaky valves, and also provides means to permit the escape of surplus water remaining from the flushing operation.

The weight necessary to cause the device to operate may be predetermined by adjusting counter-weight 30 on lever 29. It will be noted that lever 29 and fulcrum post 31 can be attached to tank mechanisms in use with little or no expense or alterations. It also is preferable to have the free area between receptacle 5 and container 1 and its top 4, greater at all times than the inlet 3, thereby preventing any possibility of flooding or of obstructing the vent.

Figs. 5 and 6 represent applications of the device, Fig. 5 representing a bowl 40 with the container 1 directly underneath, and Fig. 6 representing a bowl 40 with the container 1 and tank 20 concealed behind the sustaining wall.

Many modifications and applications of my inventions will be apparent to those skilled in the art, without departing therefrom or from the scope of the claims, my invention not being limited to the embodiment disclosed for purposes of illustration, but consisting of a flushing device working automatically without manipulation and adapted to flush thoroughly all necessary parts by connection to any desired source of water supply.

Having described one embodiment of my invention, what I claim is:

1. In a flushing device, a receptacle, and means to flush said receptacle automatically when a predetermined weight is contained in said receptacle comprising a tank, an inlet valve, a float, connections between said float and said inlet valve, a lever mounted on said connections, an outlet valve, and connections between said lever and said outlet valve.

2. In a flushing device, a receptacle, and means to flush said receptacle automatically when a predetermined weight is contained in said receptacle comprising a tank, an inlet valve, a float, connections between said float and said inlet valve, a lever mounted on said connections, an adjustable counter weight on said lever, an outlet valve, and connections between said lever and said outlet valve.

3. In a flushing device, a tank, a float, an inlet valve, an outlet valve, connections between said float and said inlet valve, a fulcrum post on said connections, a lever on said fulcrum post, and means to connect said lever and said outlet valve.

4. In a flushing device, a tank, a float, an inlet valve, an outlet valve, connections between said float and said inlet valve, a fulcrum post on said connections, a lever on said fulcrum post, an adjustable counter weight on said lever, and means to connect said lever and said outlet valve.

5. In a flushing device, a receptacle, and means to flush said receptacle automatically when a predetermined weight is contained in said receptacle comprising a tank, a float, a lever having its fulcrum connected to said float, an outlet valve, and connections between said lever and said outlet valve.

6. In a flushing device, a receptacle, and means to flush said receptacle automatically when a predetermined weight is contained in said receptacle comprising a tank, a float, a lever having its fulcrum connected to said float, an adjustable counter weight on said lever, an outlet valve, and connections between said lever and said outlet valve.

7. In a flushing device, a tank, a float, an outlet valve, a fulcrum post connected to said float, a lever on said fulcrum post, and means to connect said lever and said outlet valve.

8. In a flushing device, a tank, a float, an outlet valve, a fulcrum post connected to said float, a lever on said fulcrum post, an adjustable counter weight on said lever, and means to connect said lever and said outlet valve.

9. In a flushing device, a receptacle, and means to flush said receptacle automatically when a predetermined weight is contained in said receptacle comprising a tank, an inlet valve, a float, connections between said float and said inlet valve, an outlet valve, and permanent connections between said outlet valve and said first-mentioned connections comprising a lever fulcrumed on said float connections.

10. In a flushing device, a receptacle, and means to flush said receptacle automatically when a predetermined weight is contained in said receptacle comprising a tank, a float, means to support said float, an outlet valve, and permanent connections between said outlet valve and said float comprising a lever fulcrumed on said float supporting means.

11. In a flushing device, a receptacle, and means to flush said receptacle automatically when a predetermined weight is contained in said receptacle comprising a tank, a float, an outlet valve, a lever connected with said float, an adjustable counter weight on said lever, means to connect said lever and said outlet valve, and separate means to connect said lever and said receptacle.

12. In a flushing device, a tank, an inlet valve, an outlet valve, means to open and to close said inlet valve, means to open and to close said outlet valve, a receptacle, and connections between said receptacle and said means to operate said outlet valve from said receptacle and to permit said receptacle to approach emptied position only as the tank empties.

13. In a flushing device, a tank, an inlet valve, an outlet valve, means to open and to close said inlet valve, means to open and to close said outlet valve, a receptacle, and connections between said receptacle and said means to operate said outlet valve from said receptacle and to permit said receptacle to approach emptied position only as the tank empties and to reach final position before the tank empties completely.

14. In a flushing device, a tank, an inlet valve, an outlet valve, means to open and to close said inlet valve, means to open and to close said outlet valve, and connections between said receptacle and said means to operate said outlet valve from said receptacle and to permit said receptacle to approach emptied position only as the tank empties and to reach final position before the tank empties completely and to remain in such position until such time after the closing of said outlet valve as will permit the draining of said receptacle.

15. In a flushing device, a receptacle, and means to flush said receptacle when a predetermined weight is contained in said receptacle comprising a tank, an outlet valve for said tank, a float in said tank, and means connected with said float to control the position of said receptacle and the closing of said valve.

16. In a flushing device, a receptacle, and means to flush said receptacle when a predetermined weight is contained in said receptacle comprising a tank, an outlet valve for said tank, a float in said tank, and connections between said receptacle and said float adapted to control the position of said receptacle.

17. In a flushing device, a receptacle, and means to flush said receptacle when a predetermined weight is contained in said receptacle comprising a tank, an outlet valve for said tank, a float in said tank, and connections between said receptacle and said float to control the position of said receptacle by the position of said float until said receptacle reaches final position.

18. In a flushing device, a receptacle, and means to flush said receptacle when a predetermined weight is contained in said receptacle comprising a tank, an outlet valve for said tank, a float in said tank, and connections between said receptacle and said float to control the position of said receptacle by the position of said float until said receptacle reaches final position when said connections become slack.

19. In a flushing device, a receptacle, and means to flush said receptacle when a predetermined weight is contained in said receptacle comprising a tank, an outlet valve for said tank, a float in said tank, and connections between said receptacle and said float to control the position of said receptacle by the position of said float until the receptacle reaches final position, thereby permitting the outlet valve to close as the float continues to lower.

20. In a flushing device, a receptacle, and means to flush said receptacle when a predetermined weight is contained in said receptacle comprising a tank, an outlet valve for said tank, a float in said tank, and connections between said receptacle and said float to control the position of said receptacle by the position of said float until the receptacle reaches final position, thereby permitting the outlet valve to close as the float continues to lower, the connections becoming taut as the float rises, such period of slack permitting the receptacle to drain so that it is emptied before being raised.

21. In a flushing device, a receptacle, and means to flush said receptacle when a predetermined weight is contained in said receptacle comprising a tank, an outlet valve for said tank, a float in said tank, means to open said valve by a slight movement of said receptacle and to permit a continued movement of said receptacle as said float lowers in said tank until said float reaches a predetermined position.

22. In a flushing device, a receptacle, and means to flush said receptacle when a predetermined weight is contained in said receptacle comprising a tank, an outlet valve in said tank, a float in said tank, means to support said float, and means fulcrumed on said float supporting means connecting said receptacle and said valve.

23. In a flushing device, a receptacle, and means to flush said receptacle when a predetermined weight is contained in said receptacle comprising a tank, an outlet valve for said tank, a float for said tank, and connections between said receptacle and said valve connected to said float and of such dimensions that a slight movement of said receptacle will open said valve and the lowering of said float will enable said receptacle to continue and complete its movement to emptied position.

24. In a flushing device, a receptacle, and means to flush said receptacle when a predetermined weight is contained in said receptacle comprising a tank, an outlet valve for said tank, and means to connect said receptacle and said valve so that a slight movement of said receptacle opens said valve and the continued movement of said receptacle corresponds to the lowering of the water in said tank, and so that the receptacle reaches final position before the closing of said valve.

25. In a flushing device, a receptacle, and means to flush said receptacle when a predetermined weight is contained in said receptacle comprising a tank, an outlet from said tank, and connections between said receptacle and said outlet for opening said outlet, said connections being arranged to open said outlet completely without spilling materially the contents of said receptacle.

26. In a flushing device, a receptacle, and means to flush said receptacle when a predetermined weight is contained in said receptacle comprising a tank, an outlet from said tank, and connections between said receptacle and said outlet so arranged that said receptacle empties as the tank empties, said receptacle reaching final position while the tank still is emptying.

27. In a flushing device, a receptacle, and means to flush said receptacle when a predetermined weight is contained in said receptacle comprising a tank, an outlet valve for said tank, and means to connect said receptacle and said valve so that a slight movement of said receptacle opens said valve completely and maintains said valve in complete open position until the receptacle is in complete emptied position.

28. In a flushing device, a receptacle, and means to flush said receptacle automatically when a predetermined weight is contained in said receptacle comprising a tank, an outlet valve, and connections between said receptacle and said outlet valve comprising means to drain the receptacle after the closing of the outlet valve and before the receptacle begins to rise.

29. In a flushing device, a receptacle, and means to flush said receptacle automatically when a predetermined weight is contained in said receptacle comprising a tank, an outlet valve, and connections between said receptacle and said outlet valve comprising means to provide a period of rest for said receptacle in its lowered position after the closing of said outlet valve.

30. In a flushing device, a receptacle, and means to flush said receptacle automatically when a predetermined weight is contained in said receptacle comprising means to provide a period of disassociation of said receptacle and said outlet valve after the closing of said outlet valve and while said receptacle is in its lowered position.

In testimony that I claim the foregoing I have hereunto set my hand.

GEORGE P. BENDER.

Witnesses:
EDWIN J. PRINDLE,
AGNES F. McLAUGHLIN.